US009092599B1

(12) United States Patent
Kronrod et al.

(10) Patent No.: US 9,092,599 B1
(45) Date of Patent: Jul. 28, 2015

(54) MANAGING KNOWLEDGE-BASED AUTHENTICATION SYSTEMS

(71) Applicants: Boris Kronrod, Netania (IL); Ayelet Avni, Binyamina (IL); Lior Nudelman, Petach Tikva (IL); Oren Menes, Raanana (IL)

(72) Inventors: Boris Kronrod, Netania (IL); Ayelet Avni, Binyamina (IL); Lior Nudelman, Petach Tikva (IL); Oren Menes, Raanana (IL)

(73) Assignee: EMC Corporation, Hopkinton, MA (US)

(*) Notice: Subject to any disclaimer, the term of this patent is extended or adjusted under 35 U.S.C. 154(b) by 113 days.

(21) Appl. No.: 13/628,478

(22) Filed: Sep. 27, 2012

(51) Int. Cl.
*G06F 21/00* (2013.01)
*G06F 21/31* (2013.01)
*G06F 21/45* (2013.01)

(52) U.S. Cl.
CPC ............... *G06F 21/31* (2013.01); *G06F 21/45* (2013.01)

(58) Field of Classification Search
CPC ......... G06F 21/45; G06F 21/46; G06F 21/30; H04L 63/08
USPC ........................................ 726/5, 6, 7, 18, 19
See application file for complete search history.

(56) References Cited

U.S. PATENT DOCUMENTS 8,621,209 B1 * 12/2013 Johansson et al. ............ 713/166
2012/0216260 A1 * 8/2012 Crawford et al. ................. 726/5

* cited by examiner

*Primary Examiner* — Edward Zee
(74) *Attorney, Agent, or Firm* — Deepika Bhayana; Jason A. Reyes; Krishnendu Gupta

(57) ABSTRACT

A method is used in managing knowledge-based authentication systems. Organization based information is analyzed for information that is suitable for creating a set of responses for a question. The question is used for authenticating a user. A set of responses is created for the question based on a set of parameters. The set of responses includes incorrect responses to the question along with a correct response. The incorrect responses helps in identifying an unauthorized user.

20 Claims, 3 Drawing Sheets

MANAGING KNOWLEDGE-BASED AUTHENTICATION SYSTEMS

BACKGROUND

1. Technical Field

This application relates to managing knowledge-based authentication systems.

2. Description of Related Art

The computer systems include proprietary and non-proprietary computer networks, and often store, archive, and transmit all types of sensitive information. Many computer users and other entities have systems that utilize some form of security. Therefore, there often arises a need to prevent all but selected authorized persons from being able to carry out some defined transaction or to gain access to electronic equipment or other system, facility or data. Preventing unauthorized clearance or access typically involves devices which limit access to the subject data, facility, or transaction to those who possess a unique physical device, such as a key or who know a fixed or predictable (hereinafter "fixed") secret code. In at least some cases, relying on a fixed code or unique physical device as the means to control such selective clearance or access can mean that would-be unauthorized users need only obtain possession of the fixed code or unique device to gain such clearance or access. Typical instances of fixed codes include card numbers, user numbers or passwords issued to customers of computer data retrieval services.

Thus, one common solution for employing identity verification as a security-enhancing feature of enterprise systems that may be at risk for fraud or similar misuse is the use of secret passwords known only to actual authorized users of an enterprise system or service. In operation, it is necessary for a user to present the correct password before access is granted to data or functions of the service. The use of the correct password serves to verify a user's identity to an acceptable confidence level on the assumption that passwords are kept secret and are not easily guessable. However, passwords provide little security in that they are generally susceptible to inappropriate access, through either brute-force attacks or through phishing. Phishing is the sending of electronic communication that claims to be from some web-site in order to trick the recipient into revealing information for use in having the user reveal information such as his username and password. The user is often directed to a web-site that looks like the actual web-site in question and may silently redirect the user to the real web site after collecting their username and password or use a man-in-the-middle server.

Another identity verification technique is referred to as "knowledge-based authentication" or KBA. KBA employs one or more challenge questions whose answers are typically intended to be readily recalled by the actual known user (referred to as the "genuine" user) while being unknown and difficult to guess by another person posing as the known user (referred to as the "fraudster"). KBA questions require data that is specific to the known user.

A knowledge-based identity verification system receives and processes a verification request to verify the identity of a current user as the known user. The knowledge-based authentication system forms one or more questions. The question or questions are then presented to the user. When the user responds, the response supplied by the user is compared to a valid response to the question. The result of the comparison can serve as a basis for increased or decreased confidence in the identity of the current user, and corresponding actions may be initiated. If the comparison between the responses supplied by the user and the correct responses are true, the user is allowed access to the target of the authentication. Otherwise, the user is not authenticated. For example, the identity verification system may provide an output indicating whether the comparison resulted in a match, indicating that the current user answered the challenge question(s) correctly. This output may be used by a protected service to make a decision whether to allow a transaction or access to protected data or functionality.

An information validation service known as RSA Identity Verification or Verid created by RSA, The Security Division of EMC, Bedford, Mass., compiles, and enables verification of the identity of a user through inquiries into public record or publicly available information regarding the user's status and/or activities. It is not expected that the user would necessarily answer all questions to correspond exactly to the answers on file. Thus, there is a usual threshold set such as a majority of the questions, for example 2 out of 3 questions, will qualify as a pass, or alternatively for example, 2 out of 3 questions could trigger a second round of an additional number of questions. Based on the strength of the user's assertion, various options are available including posing further questions and/or re-directing the user to an alternate authentication approach.

In particular, Verid provides a question based screened verification method that includes asking an individual questions regarding the individual's asserted identity at an authorized location to determine whether the individual's asserted identity is correct.

Conventional knowledge-based authentication (KBA) involves deriving questions regarding a particular user from facts in a publicly available database, and asking that user one or more of the derived questions to verify the authenticity of the user. For example, conventional KBA accesses facts such as addresses, mortgage payments, and driving records from a LexisNexis® server, a credit bureau or a motor vehicle registry.

Suppose that a user wishes to make a purchase at a store using a store account. In conventional KBA, the store may ask the user a set of questions derived from a set of facts concerning the user in order to complete the purchase. Such questions may include "when were you married?", "what was the make and model of your first car?", and "what was the name of your first pet?". If the user answers the questions correctly, the store completes the purchase. On the other hand, if the user answers questions incorrectly, the store may take remedial steps to verify the authenticity of the user. For example, the store may ask for further proof of identity such as a driver's license.

Unfortunately, there are deficiencies with the above-described conventional KBA. For example, facts obtained from a publicly available database may be known by members of the public. Consequently, KBA questions and responses derived from such facts may be insecure because an imposter may have examined facts relevant to a particular legitimate user.

SUMMARY OF THE INVENTION

A method is used in managing knowledge-based authentication systems. Organization based information is analyzed for information that is suitable for creating a set of responses for a question. The question is used for authenticating a user. A set of responses is created for the question based on a set of parameters. The set of responses includes incorrect responses to the question along with a correct response. The incorrect responses helps in identifying an unauthorized user.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
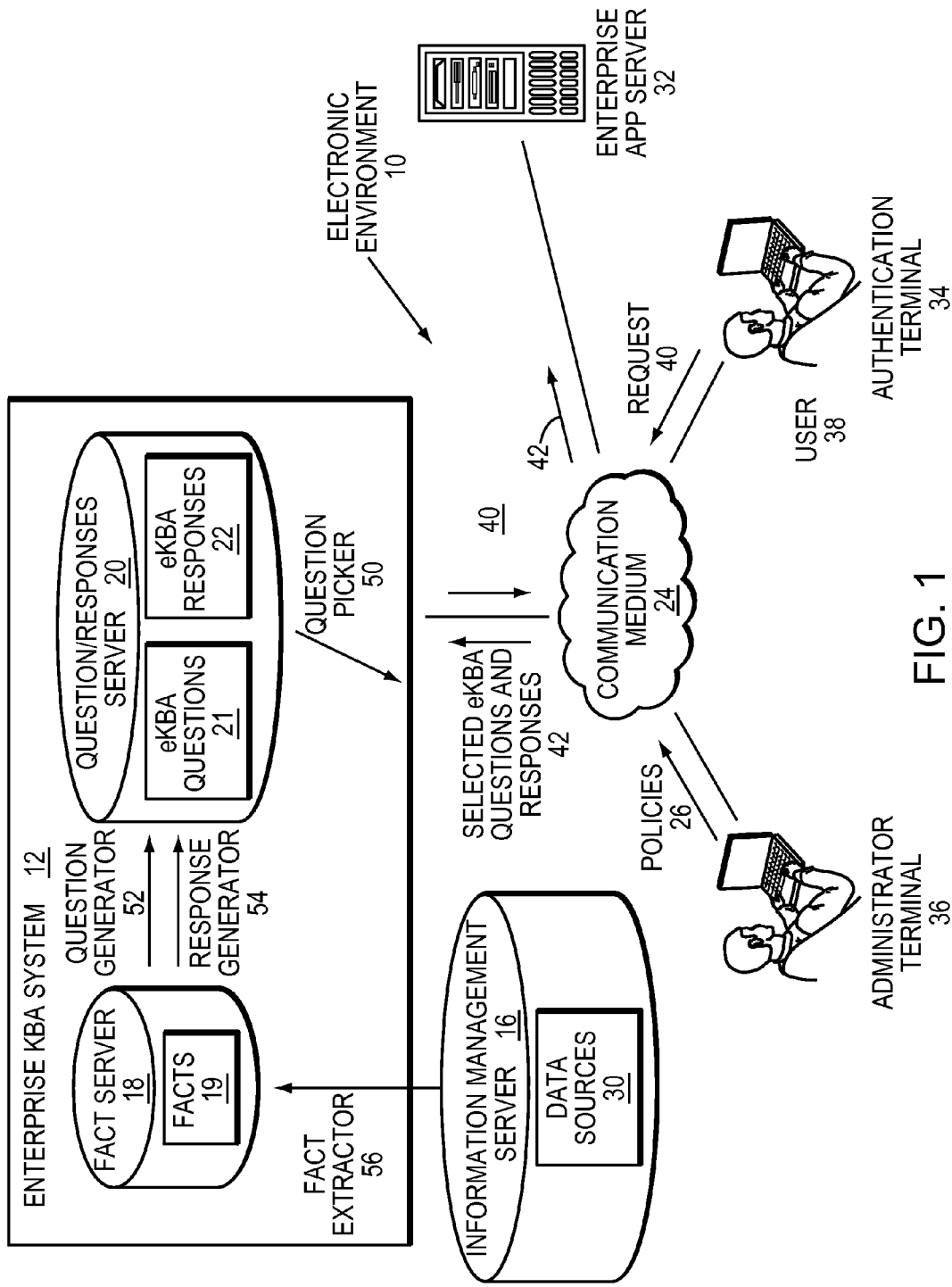
FIG. 1 is an example of an embodiment of a computer system that may utilize the techniques described herein.

Described below is a technique for use managing knowledge based authentication systems, which technique may be used to provide, among other things, analyzing organization based information for information that is suitable for creating a set of responses for a question, where the question is used for authenticating a user, and creating a set of responses for the question based on a set of parameters, where the set of responses includes incorrect responses to the question along with a correct response, where the incorrect responses helps in identifying an unauthorized user.

Conventionally, for example, suppose that an employee of a corporation wishes to access sensitive files stored in a database under the control of the corporation, a conventional knowledge-based authentication system generates a set of questions and responses for authenticating a user from publicly available facts. However, in such a conventional system, publicly available facts such as what type of car a user owns or what city and state the user was born in are also available to third parties via public records. Further, in such a conventional case, even questions which relate to information that is inaccessible in public records, for example, a user's favorite color, can be found out using techniques such as phishing that are used to compromise usernames and passwords. Further, in such a conventional case, publicly available facts pose a risk of exposure to potential imposters (also referred to herein as "fraudsters").

Further, conventionally, when a member (e.g., employee) of an enterprise forgets a password for accessing organizational information, the member contacts a service representative or self-service portal for resetting the password and only provides personal information such as badge number, name, and business telephone number. In such a conventional case, such personal information may be available on a business card thereby making such information susceptible to be stolen and accessed by a fraudster. Further, in such a conventional case, using conventional knowledge based authentication ("KBA") system to authenticate the employee, an enterprise has little control over the security of KBA questions because the enterprise does not control the source of public facts used for creating KBA questions.

In at least some implementations in accordance with the technique as described herein, an enterprise knowledge-based authentication ("eKBA") system provides an on-premise identity verification enabling customers to create stronger identity verification challenges for their internal audience such as employees, contractors, and partners. A user attempting to seek access to corporate assets through a self service portal or a service representative is challenged with multiple choice questions based on corporate data sources associated with that user. Corporate data sources may include facts from documents such as emails, meeting notices, presentations, and spreadsheets that are stored on a organizational information management server such as a Microsoft® Exchange server or IBM Lotus® Domino server. Further, corporate data sources include information that may be available in an organization such as who emailed recently to a user that is being authenticated and to whom the user sent emails recently. Thus, in at least one embodiment of the current technique, challenge questions and responses to the challenge questions are generated based on information under the control of an organization.

Thus, in at least one embodiment, the current technique allows an organization to be confident in the security of the eKBA questions used to authenticate users attempting to access resources belonging to the organization. Moreover, information management servers from which facts are used to derive eKBA questions are not available to the public because the information stored on the information management servers is confidential. Consequently, an organization may have control over the security of the eKBA questions because the source of facts for those questions is under the control of the organization.

A typical scenario may be where a user such as an employee of a corporation contacts a corporate service representative ("SR") indicating to the SR that the user does not remember corporate login password and provides a badge number as identification. In such a case, the SR uses the badge number to identify the alleged employee and obtains a set of challenge questions and responses associated with the set of challenge questions and presents such questions to a user for authenticating the user.

In such a case, when an organization or corporation attempts to authenticate a user within the organization, an eKBA system may retrieve information from information management server such that the organization acquires facts from documents such as emails, meeting notices, presentations, and spreadsheets that are stored on a information management server such as a Microsoft® Exchange server or IBM Lotus® Domino server. A eKBA server then generates eKBA questions and responses from the acquired facts and stores the eKBA questions and responses on a question/response server.

For example, an eKBA system forms questions from data in the email (e.g., emails from a Microsoft Exchange® server) associated with a user discussing a meeting with another person at a particular time and place. Such questions can be: "Which of the following individuals sent you a large number of emails over the last week?", "Which of the following is a recurring meeting in your calendar?", "Which of the following is a due task in your calendar?" and so forth.

In at least some implementations in accordance with the technique as described herein, a set of responses are created for a question generated by eKBA system in such a way that the set of responses includes incorrect responses (also referred to as "wrong answers", "fake answers" or "confounders") where incorrect responses are difficult for a fraudster to guess and distinguish from the correct response but easy for a genuine user which is being authenticated. Thus, for example, a challenge question and responses associated with the challenge question may be generated based on a recent long chain of emails instead of an email sent and/or received few months ago because a genuine user is most likely to remember the recent long chain of emails instead of the old email sent and/or received few months ago.

In at least some implementations in accordance with the technique as described herein, the use of a set of parameters for creating a set of incorrect responses can provide one or more of the following advantages: improving authentication by creating a set of incorrect responses that may not be known or easily guessed by a fraudster, improving security by generating questions and responses from enterprise facts associated with a user within an organization where the organization retains control over the security of the facts used to generate eKBA questions and responses.

Thus, the improved technique prevents a hacker or third party from finding out the correct response to a challenge question as corporate information associated with a user is not public information. Further, phishing is curtailed as corporate information associated with a user changes and evolves over time, thus changing the user's response to a challenge question based on them. Further, incorrect responses to a challenge question are created in such a way that the incorrect responses are similar to correct responses such that the similarity poses a difficultly for a fraudster to guess the correct response but does not pose a problem for a genuine user such that the genuine user is able to distinguish the incorrect responses from the correct response.

Referring now to FIG. 1, shown is an example of an embodiment of an enterprise knowledge-based authentication system that may be used in connection with performing the technique described herein. FIG. 1 illustrates an electronic environment 10 for carrying out the current technique. Electronic environment 10 includes enterprise KBA system 12, organizational information management server 16, enterprise app server 32, authentication terminal 34, and communications medium 24.

The electronic environment 10 includes enterprise knowledge-based identity verification component 12 that performs identity verification for a user attempting to access corporate information or a protected organizational server (e.g., eroom). Generally, identity verification involves a user 38 providing information, often secret, that is uniquely associated with a particular user. A simple example includes a password or personal identification number (PIN). Knowledge-based identify verification is typically more involved. The knowledge-based identity verification component has access to information that should be known by a user whose identity is being verified, and this information is used to generate challenge questions that must be answered correctly by the user 38 as a condition to identity verification.

User 38 sends, to eKBA system 12, a request 40 to access resources 14. Request 40 may include a user identifier (such as badge number) associated with a member of the organization.

Initially, the user 38 of an organization provides some initial identifying information such as a name, and a badge number to a service representative or an authentication service (e.g., self service portal) and the service representative or authentication service initiates an exchange with the identity verification component 12 to verify the user's identity as a condition to providing access to protected data or functions of the organization. In this context a distinction is made between a "known user" and a "current user", to allow for the possibility that they may be different. A "known user" is the actual employee of the organization, while a "current user" is a user currently requesting service by presenting himself/herself as the known user. That is, the identifying information provided to the service representative or authentication service presumably identifies a known user, and is being provided by a current user who is either the known user (commonly referred to as "genuine") or somebody else posing as the known user ("fraudster"). The goal of identity verification is to increase the confidence that the current user is the genuine user rather than the fraudster.

Upon receipt of request 40, eKBA system 12 provides user 38 with selected eKBA questions 42 from eKBA questions 21 stored on question/response server 20. User 38 provides eKBA system 12 with answers (not pictured) to selected eKBA questions 42, and based on the answers, eKBA system 12 authenticates user 38.

Communication medium 24 provides network connections between enterprise KBA system 12, information management server 16, enterprise app server 32, and authentication terminal 34. Communications medium 24 may implement a variety of protocols such as TCP/IP, UDP, ATM, Ethernet, Fibre Channel, combinations thereof, and the like. Furthermore, communications media 24 may include various components (e.g., cables, switches/routers, gateways/bridges, NAS/SAN appliances/nodes, interfaces). Moreover, the communications medium 24 are capable of having a variety of topologies (e.g., queue manager-and-spoke, ring, backbone, multi drop, point to-point, irregular, combinations thereof, and so on).

Information management server 16 stores applications and data concerning organizational personal information including email, calendar, and shared documents for members of an enterprise. For example, the enterprise may be a corporation whose members are employees. Data stored in information management server 16 takes the form of various data sources 30 such as email messages, meeting notices, and documents on which members have collaborated. For example, that a data source may a Microsoft Exchange® server, data source maybe an IBM Lotus Domino® server, and data source may be an SAP server. In some arrangements, some or all of data sources 30 are remote from eKBA system 12; in other arrangements, some or all of data sources 30 are in the same location as eKBA system 12.

Enterprise KBA system 12 obtains facts 19 from information management server 16, stores facts 19 on fact server 18, generates eKBA questions 21 from facts 22, and provides selected KBA questions 42 to authentication terminal 34 via enterprise app server 32. eKBA system 12 includes a fact server 18, a question/response server 20, a question generator 52, a response generator 54, a fact extractor 56, and a question picker 50.

Enterprise app server 32 provides an application programming interface (API) for providing questions and responses including incorrect responses to user 38. Authentication terminal 34 receives questions from enterprise app server 32 and presents them to user 38, in some cases through a service representative. In some arrangements, authentication terminal 32 is a net view terminal.

Fact server 18 is an electronic system in communication with question generator 52. Fact server 18 acquires facts 19 from information management server 16 and stores facts 19 within a fact database 78 (see FIG. 2). In some arrangements, fact server 18 generates facts 19 from data sources 30 stored on information management server 16.

Question generator 52 is an electronic system in communication with fact server 18 and question/response server 20 that generates eKBA questions 21 and associated eKBA responses including incorrect responses from facts 19. Question/response server 20 is an electronic system in communication with question generator 52 and question picker 50. Question/response server 20 stores eKBA questions 21 and associated eKBA responses 22 and sends eKBA questions 21 to question picker 50 for question selection.

Question picker 50 is an electronic system in communication with question/response server 20. Question picker 50 selects questions 42 from eKBA questions 21 stored on eKBA question/response server 20 based on certain criteria. For example, question picker 50 filters out eKBA questions 21 that have already been provided to users such as user 38. In some arrangements, question/response server 20 is also in communication with external systems such as enterprise app server 32. Question picker 50 may also be in communication with authentication terminal 34 at which a service representative provides questions 42 to user 38.

During an operation, enterprise KBA (eKBA) system 12 extracts a set of facts 19 from data sources 30 stored on information management server 16. In some arrangements, eKBA system 12 performs the extraction on a periodic basis, e.g., a nightly run. In other arrangements, however, eKBA system performs the extraction in response to an event.

Further, an administrator may use administrator terminal 36 for providing policies 26 to eKBA system 12 for generating a set of responses.

Figure 2:
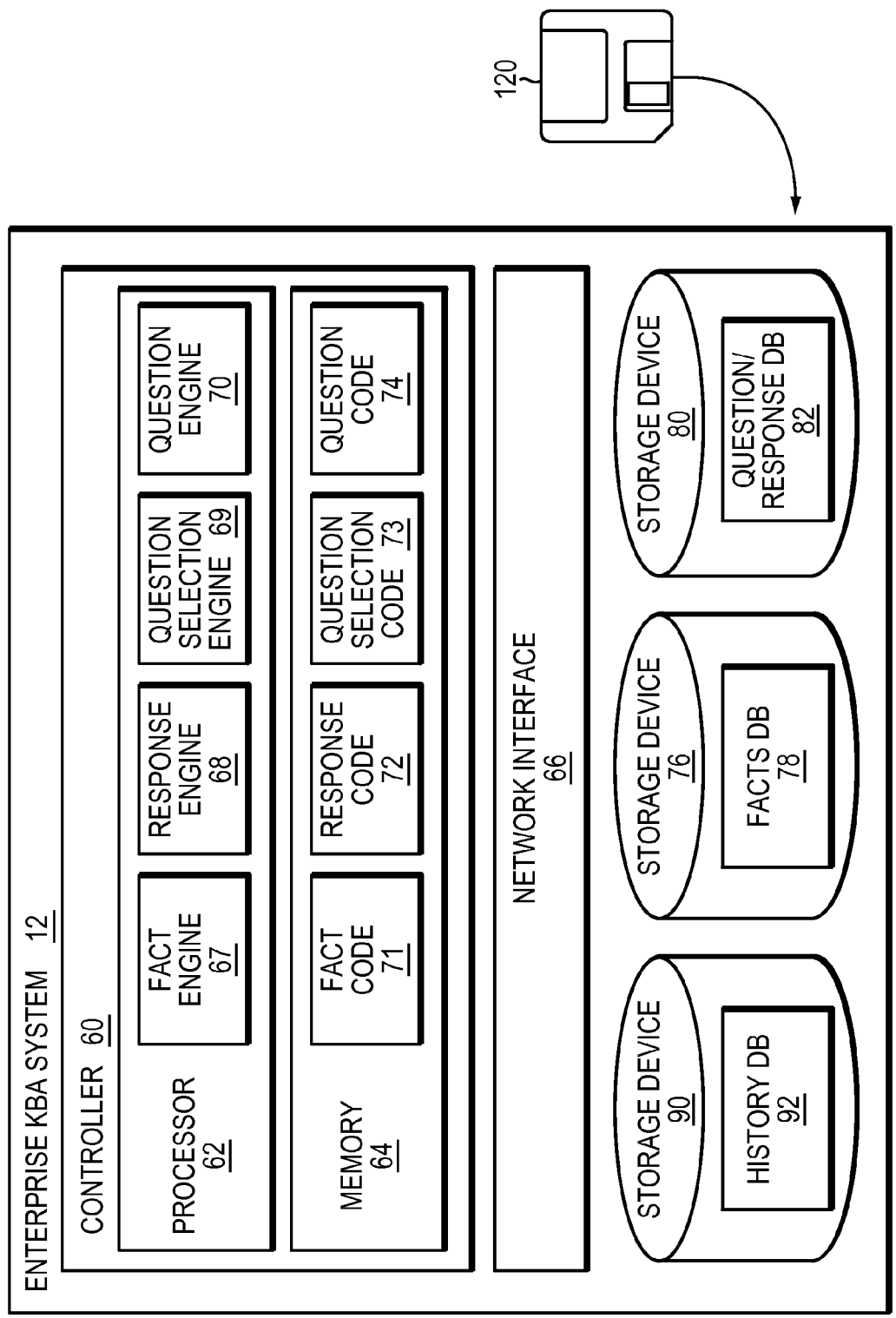
FIGS. 2-3 are block diagrams illustrating in more detail components that may be used in connection with techniques described herein.

FIG. 2 illustrates further details of eKBA system 12. Enterprise KBA 12 includes controller 60, which in turn includes processor 62 and memory 64, network interface 66, fact server 18 on which facts database 78 is stored, and question/response server 20 on which questions database 82 is stored.

Network interface 66 takes the form of an Ethernet card; in some arrangements, network interface 66 takes other forms including a wireless receiver and a token ring card.

Memory 64 is configured to store code which includes fact code 71 configured to extract raw data from data sources 30 organized in information management server 16 (see FIG. 1) and convert the raw data in a distinct data format with which a fact source is stored in fact database 78. Further, memory 64 is configured to store code which includes question code 74 configured to generate a set of eKBA questions from facts 19 obtained from information management server 16. The eKBA questions, in turn, are stored in fact database 78. Further, memory 64 is configured to store code which includes response code 72 configured to generate a set of incorrect responses from facts 19 obtained from information management server 16 based on a set of rules and/or parameters. The set of incorrect responses, in turn are stored in question/response database 82. Further, memory 64 is configured to store code which includes question selection code 73 configured to select a set of questions that are provided to user 38 based on a use case scenario.

Memory 64 generally takes the form of, e.g., random access memory, flash memory or a non-volatile memory.

Processor 62 takes the form of, but is not limited to, Intel or AMD-based micro-processor units (MPUs), and can include a single or multi-cores each running single or multiple threads. Processor 62 is coupled to memory 64 and is configured to execute instructions from question selection code 73, response code 72, fact code 71, and question code 74.

Processor 62 includes fact engine 67, response engine 68, question selection engine 69, and question engine 70. Processor 62 accesses data 30 (see FIG. 1) over network interface 66. For example, information management server 16 may include a database (not pictured) on which data sources 30 may be stored. Processor 62 would then perform lookup operations on the database to find data 30 that had been stored in the database since the previous lookup operation.

Fact engine 62 forms facts 19 from data sources 30 accessed on information management server 16. Question engine 70 derives eKBA questions 21 from facts 19 and stores derived eKBA questions 21 in question/response database 82.

Response engine 68 derives eKBA responses 22 from facts 19 and stores derived eKBA responses 22 in question/response database 82.

Furthermore, it should be understood that some embodiments are directed to enterprise KBA system 12 which is, constructed and arranged to provide a set of incorrect responses for a question selected to authenticate a user. Some embodiments are directed to a process of providing a set of incorrect responses for a question in an enterprise KBA system. Also, some embodiments are directed to a computer program product which enables computer logic to provide a set of incorrect responses in an enterprise KBA system.

In some arrangements, enterprise KBA system 12 is implemented by a set of processors or other types of control/processing circuitry running software. In such arrangements, the software instructions can be delivered, within enterprise KBA system 12 in the form of a computer program product 120, each computer program product having a non-transitory computer readable storage medium which stores the instructions in a non-volatile manner. Alternative examples of suitable computer readable storage media include tangible articles of manufacture and apparatus such as CD-ROM, flash memory, disk memory, tape memory, and the like.

Figure 3:
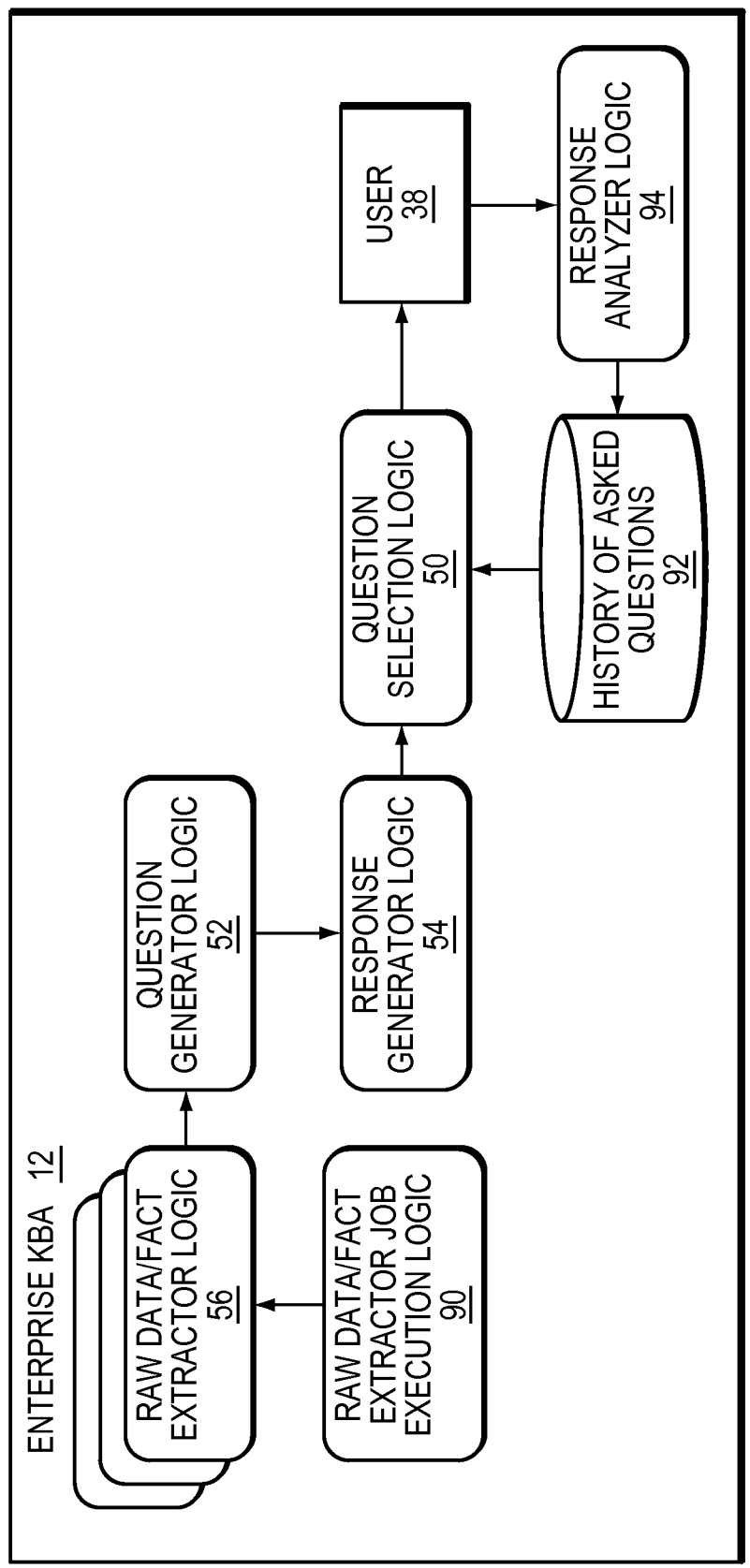

Referring to FIG. 3, shown is a detailed representation of components that may be included in an embodiment using the techniques described herein. With reference also to FIGS. 1 and 2, in at least one embodiment of the current technique, question engine 70 engages question generator logic 52 to generate questions for each user in an organization based on organization facts and scores each of the generated question based on the quality of each question. Further, response engine 68 engages response generator logic 54 to create an appropriate set of confounders (also referred to as "wrong answer", "fake answer", or "incorrect answer/response") for each of the question generated by the question generator logic 52.

In at least one embodiment of the current technique, quality of a question is defined by a set of parameters such as how well a genuine user can remember facts presented in the question. If the genuine user is able to remember the facts presented in a question effectively, the quality of the question is considered high. Further, the set of parameters that indicates quality of a question may include a parameter such as how easy it is to guess the correct answer (also referred to herein as "correct response") by a fraudster. If the information and/or facts provided as part of a set of responses to a question may be well known and/or easily accessible, quality of the question is considered low. Further, the set of parameters that indicates quality of a question may include a parameter such as how much information a question exposes to a potential fraudster. For example, if a question includes an e-mail subject that provides a hint to a merger and acquisition process, or an activity indicating hiring or firing of an employee, quality of the question is considered low indicating that the question is not suitable for authenticating the user. Further, the set of parameters that indicates quality of a question may depend upon incorrect responses to the questions that are provided to a user along with the correct response. For example, whether incorrect responses to a question are similar to the correct response in such a way that it is difficult or impossible for a fraudster to guess and select the correct response out of a set of responses including the incorrect responses.

In at least one embodiment of the current technique, response generator logic 54 generates incorrect responses for a question based on a set of parameters (also referred to as "rules", "policies") in such a way that it is easy for a genuine user to distinguish the incorrect responses from the correct response but hard for a fraudster to easily guess the correct response from the set of responses including the incorrect responses.

In at least one embodiment of the current technique, in case of emails, incorrect responses with high quality maybe defined based on a set of parameters. For example, a set of parameters used for generating incorrect responses for a question related to email addressees included in emails sent to internal recipients in an organization by internal audience (e.g., employees) of the organization may include the following parameters:

1) An incorrect response preferably includes an email address that is associated with a user in the same organization group as a recipient of an email which is the correct response for the question.

2) An incorrect response preferably includes an email address that is associated with a user which is located in the same geographical location as the geographical location of a recipient of an email which is the correct response for the question. For example, if a user which is being authenticated is located at an office in Israel, incorrect responses may not include an email address of any employee which is located at an office in United States.

3) An incorrect response preferably includes an email address that is associated with a user which is of the same ethnicity as the ethnicity of a recipient of an email which is the correct response for the question.

In at least one embodiment of the current technique, for example, for a question related to email addresses included in emails sent to internal recipients in an organization by external audience (e.g., customers, vendors) of the organization, parameters that may be considered for generating incorrect responses are:

1) If an original recipient of an email based on which the correct response for a question is generated is in a public email domain (e.g., gmail.com), an incorrect response preferably also includes an email address based on a public domain email system.

2) If an original recipient of an email based on which the correct response for a question is generated is in an enterprise email domain (e.g., miscrosoft.com), an incorrect response preferably also includes an email address based on an enterprise email domain In at least one embodiment of the current technique, for example, for a question related to email addresses included in emails received by internal audiences from internal recipients in an organization, a set of parameters that may be considered for generating incorrect responses are:

1) An incorrect response preferably includes an email address that is associated with a user in the same organization group as a sender of an email based on which the correct response for the question is generated.

2) An incorrect response preferably includes an email address that is associated with a user who is located in the same geographical location as the geographical location of a sender of an email based on which the correct response for the question is generated.

3) An incorrect response preferably includes an email address that is associated with a user which is of the same ethnicity as the ethnicity of a sender of an email based on which the correct response for the question is generated.

4) An incorrect response preferably does not include an email address of a user who is a sender in any other emails to a user who is being authenticated.

In at least one embodiment of the current technique, for example, for a question related to email addresses included in emails received by internal recipients in an organization from external audiences of the organization, parameters that may be considered for generating incorrect responses are:

1) If an original sender of an email based on which the correct response for a question is generated is in a public email domain (e.g., gmail.com), an incorrect response preferably also includes an email address based on a public domain email system.

2) If an original sender of an email based on which the correct response for a question is generated is in an enterprise email domain (e.g., miscrosoft.com), an incorrect response preferably also includes an email address based on an enterprise email domain.

3) An incorrect response preferably does not include an email address of a user who is a sender in any other emails to a user who is being authenticated.

Further, additional parameters that may be considered are:

1) An incorrect response preferably includes an email address which is a valid email address such that it is difficult or impossible for a fraudster to guess the correct response from a set of responses including incorrect responses.

2) An incorrect response preferably does not include an email address associated with anyone who is a part of contacts list of a user which is being authenticated.

3) An incorrect response preferably does not include an email address of a user who is a part of an executive black list indicating that the information for the user may not be exposed.

4) An incorrect response preferably does not include an email address of a user who is a recipient in any other emails from a user who is being authenticated.

Further, it should be noted that a set of rules/parameters (also referred to herein as "polices") described above herein for generating a high quality incorrect response is not exhaustive and additional rules/parameters may be defined by a customer or user of enterprise KBA system 12. Further, response generator logic 54 may analyze every email associated with a user and create a set of incorrect responses for the user. Further, a set of incorrect responses for a user may be created manually. Further, a set of incorrect responses for a user may be created automatically by scanning entire data sources of information management server 16 (such as Microsoft exchange information) associated with an organization.

Further, in at least one embodiment of the current technique, response generator logic 54 may periodically update incorrect responses associated with a question generated by question generator 52 such that the incorrect responses remain valid. For example, a user may start interacting with a member of an enterprise with which the user has either never interacted or interacted recently.

As described above, enterprise knowledge-based authentication system 12 in accordance with the current technique may be used to help securely authenticate the identity of a user. As used herein, "authenticate" means to verify the identity of a user, and so "authenticate" and "verify" can be used interchangeably throughout. Also, although the specification discusses, for simplicity, authentication of "users," it should be understood that "users" means any entity requiring authentication such as, for example, a person, device, machine, or computer. The inclusion of a single user is exemplary, and typically the system can be used to authenticate a large number of users. Similarly, the inclusion of a single authentication system is exemplary.

Enterprise knowledge-based authentication system 12 can be any sort of device that implements the functions described herein. In at least one embodiment, at least some of system 12 may be implemented as software running on an actual or virtual server class computer including a processor, memory, and so on, to enable authentication of a large number of users, for example, in an enterprise. At least some of system 12 can also be implemented as software running on a desktop computer, laptop computer, special-purpose device, or personal digital assistant (PDA). For example, at least some of system 12 can be implemented as a software program running on a general-purpose computer, possibly interacting with one or more other computer programs on the same or a different computer. Some or all of the system 12 functionality can be implemented in hardware, for example in an Application Specific Integrated Circuit (ASIC). In still further embodiments, at least some of system 12 can be implemented in a cellular telephone, or specialized hardware embedded in a cellular telephone and adapted to interact with the cellular telephone's circuitry. Other sizes, shapes, and implementations are possible without departing from the spirit of the invention.

Authentication can result in the performance of one or more actions including, without limitation, providing access or privileges, taking action, or enabling some combination of the two. Access includes, without limitation: access to communications network, or a computer system; access to such services as financial services and records, or health services and records; or access to levels of information or services. The user and at least some of system 12 can be physically near one another or far apart.

As described, a user can communicate with enterprise KBA system 12. Enterprise KBA system 12 can optionally provide a user interface. Communication between the user 38 and enterprise KBA system 12 can take place via this user interface. The user interface may provide an input interface, an output interface, or both. An input interface may enable the user to communicate information to enterprise KBA system 12. For example, enterprise KBA system 12 may include a web-browser with a plug-in software component.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing knowledge-based authentication systems, the method comprising:
analyzing organization based information for information that is suitable for creating a set of responses for a question, wherein the question is used for authenticating a user, wherein the organization based information is gathered from data from a set of distributed organizational information sources of an organization, wherein the set of distributed organizational information sources are under control of the organization, wherein a knowledge-based authentication system generates the question and the set of responses, wherein the knowledge-based authentication system includes a question-response generator component and a question-picker component, wherein the question-response generator component generates the question and the set of responses;
creating the set of responses for the question based on a set of parameters, wherein the set of responses includes incorrect responses to the question along with a correct response, wherein the incorrect responses helps in identifying an unauthorized user, wherein the set of responses generated based on the set of parameters enables an authorized user to distinguish between the incorrect responses and the correct response and prevents an unauthorized user to guess the correct response from the set of responses, wherein the set of responses and the question are stored in a question-response component, wherein the incorrect responses are updated periodically; and
providing the question and the set of responses to the user for authenticating the user, wherein the user selects a response from the set of responses, wherein the question-picker component selects the question from a set of questions based on a set of criteria and a use case scenario.

2. The method of claim 1, wherein the organization based information includes user emails and information regarding user meetings.

3. The method of claim 1, wherein the user is authenticated during a password reset process.

4. The method of claim 1, wherein the user is authenticated when accessing an organization document.

5. The method of claim 1, wherein the question is presented to the user as a multiple choice question.

6. The method of claim 1, wherein the set of responses is updated periodically.

7. The method of claim 1, wherein the question is derived on demand.

8. The method of claim 1, wherein the set of responses pertains to which people the user emails.

9. The method of claim 1, wherein the set of responses pertains to from which people the user receives emails.

10. The method of claim 1, wherein the set of responses pertains to which people the user lists as contacts.

11. The method of claim 1, wherein the set of parameters include ethnicity of a recipient of an email and the user, the type of an email address, a geographic location of the user, and the type of group to which the user belongs.

12. The method of claim 1, wherein the set of parameters are provided by an administrator of a knowledge-based authentication system.

13. A system for use in managing knowledge-based authentication systems, the system comprising:
a knowledge-based authentication system comprising a processor configured to:
analyze organization based information for information that is suitable for creating a set of responses for a question, wherein the organization based information is gathered from data from a set of distributed organizational information sources of an organization, wherein the set of distributed organizational information sources are under control of the organization, wherein the question is used for authenticating a user, wherein the knowledge-based authentication system includes a question-response generator component and a question-picker component, wherein the question-response generator component generates the question and the set of responses;
create the set of responses for the question based on a set of parameters, wherein the set of responses includes incorrect responses to the question along with a correct response, wherein the incorrect responses helps in identifying an unauthorized user, wherein the set of responses generated based on the set of parameters enables an authorized user to distinguish between the incorrect responses and the correct response and prevents an unauthorized user to guess the correct response from the set of responses, wherein the set of responses and the question are stored in a question-response component, wherein the incorrect responses are updated periodically; and provide the question and the set of responses to the user for authenticating the user, wherein the user selects a response from the set of responses, wherein the question-picker component selects the question from a set of questions based on a set of criteria and a use case scenario.

14. The system of claim 13, wherein the organization based information includes user emails and information regarding user meetings.

15. The system of claim 13, wherein the user is authenticated during a password reset process.

16. The system of claim 13, wherein the set of responses is updated periodically.

17. The system of claim 13, wherein the set of responses pertains to which people the user emails and wherein the set of responses pertains to from which people the user receives emails.

18. The system of claim 13, wherein the set of responses pertains to which people the user lists as contacts.

19. The system of claim 13, wherein the set of parameters include ethnicity of a recipient of an email and the user, the type of an email address, a geographic location of the user, and the type of group to which the user belongs.

20. The system of claim 13, wherein the set of parameters are provided by an administrator of a knowledge-based authentication system.

* * * * *